(No Model.) 2 Sheets—Sheet 1.
W. A. WRIGHT.
BICYCLE, &c.
No. 499,694. Patented June 13, 1893.
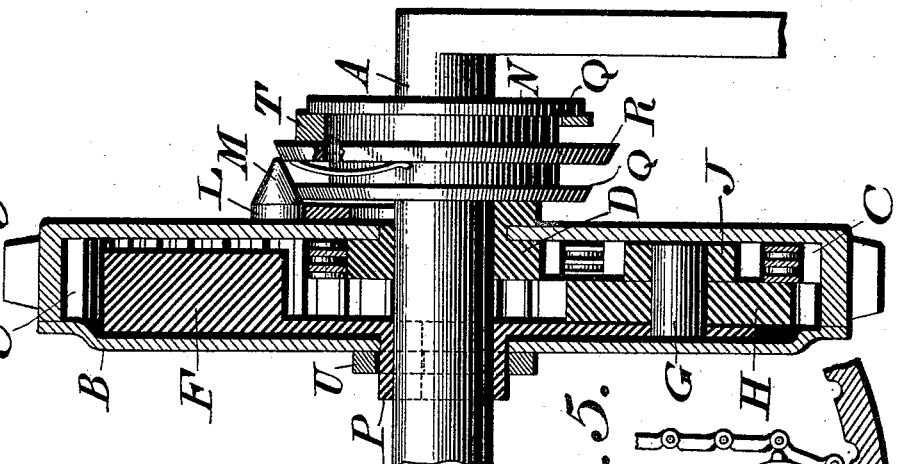
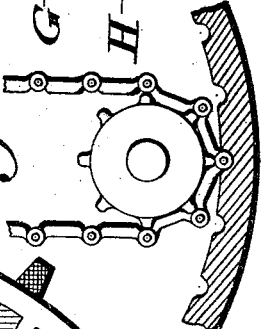
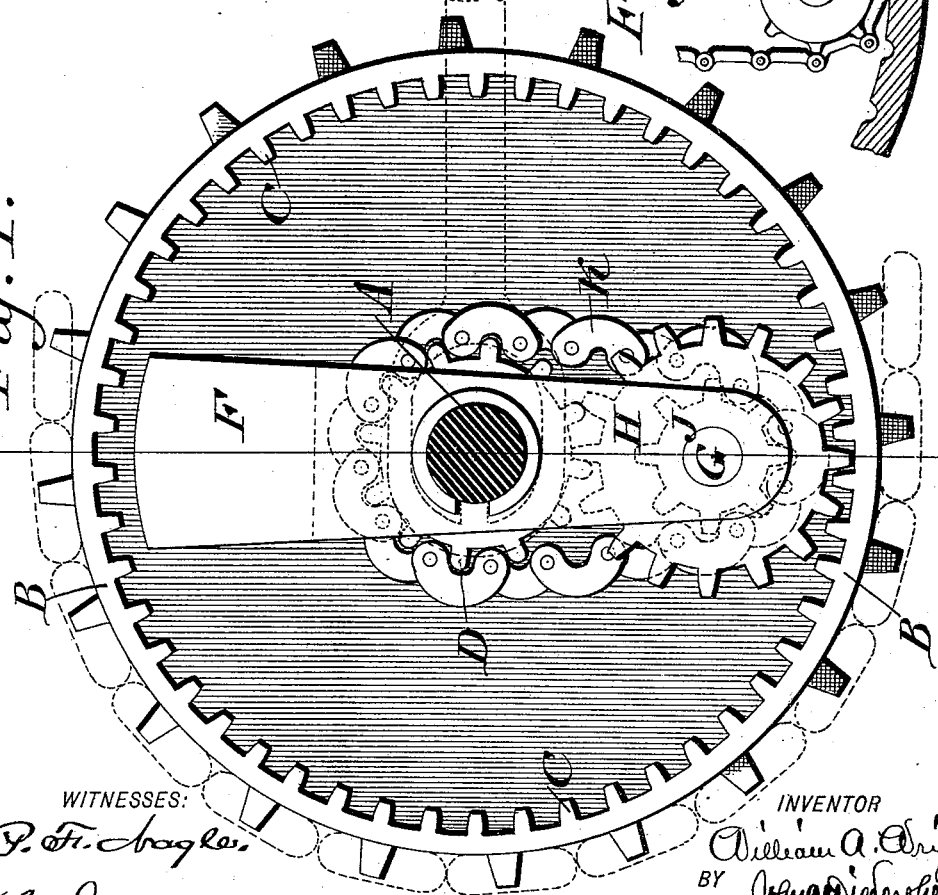
WITNESSES:
INVENTOR
William A. Wright
BY
ATTORNEY.

(No Model.) 2 Sheets—Sheet 2.
W. A. WRIGHT.
BICYCLE, &c.
No. 499,694. Patented June 13, 1893.
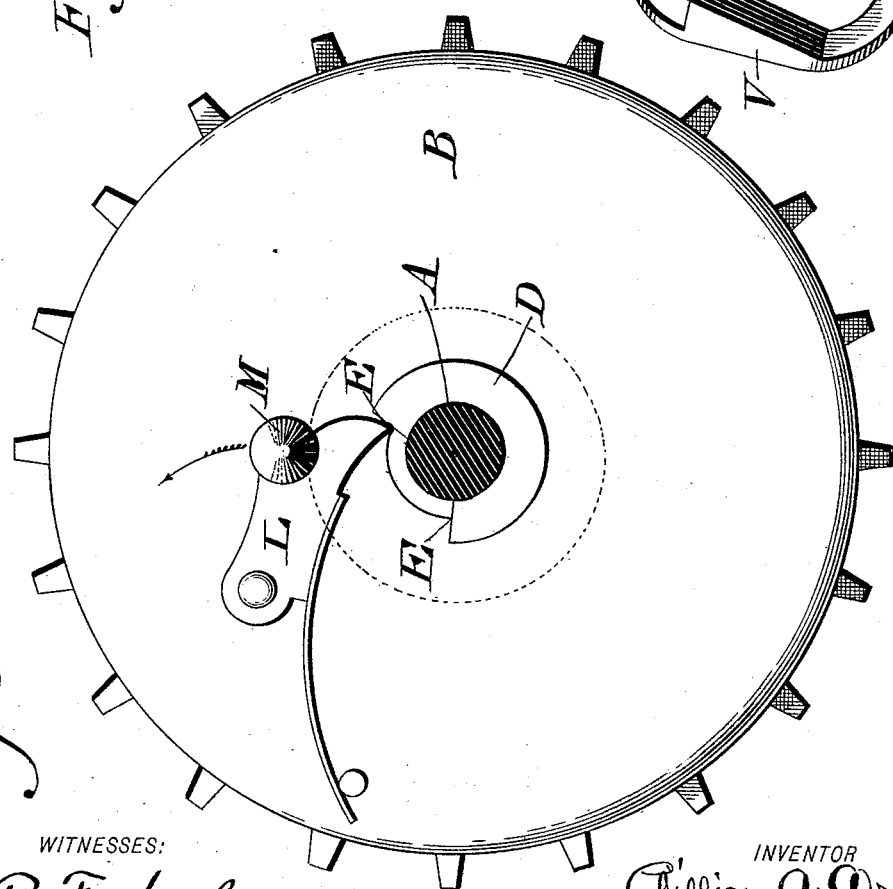
WITNESSES:
P. F. Nagle.
L. Douville.
INVENTOR
William A. Wright,
BY
[signature]
ATTORNEY.

UNITED STATES PATENT OFFICE.

WILLIAM A. WRIGHT, OF CENTRETON, NEW JERSEY, ASSIGNOR OF ONE-HALF TO CHARLES N. APPLE, OF PHILADELPHIA, PENNSYLVANIA.

BICYCLE, &c.

SPECIFICATION forming part of Letters Patent No. 499,694, dated June 13, 1893.

Application filed October 14, 1892. Serial No. 448,911. (No model.)

*To all whom it may concern:*

Be it known that I, WILLIAM A. WRIGHT, a citizen of the United States, residing at Centreton, in the county of Burlington, State of New Jersey, have invented a new and useful Improvement in Bicycles, &c., which improvement is fully set forth in the following specification and accompanying drawings.

My invention consists of an improvement in bicycles, whereby power may be imparted to the bicycle when it is desired to ascend hills or deep grades, and speed may be obtained when the bicycle is on flat ground.

Figure 1 represents a section of a portion of a bicycle embodying my invention. Fig. 2 represents a partial section and partial end view of a portion of a bicycle embodying my invention. Fig. 3 represents a side elevation of a portion thereof. Fig. 4 represents a perspective view of a portion thereof. Fig. 5 represents a modified form of a portion of the device.

Similar letters of reference indicate corresponding parts in the several figures.

Referring to the drawings: A designates the axle of a bicycle, to which the crank arms of the pedal thereof are attached, and on which is mounted the hollow sprocket wheel B, having an internal gear C. Around said sprocket wheel passes the propelling chain of the bicycle. Secured to the shaft A and on the interior of the sprocket B is a gear wheel D, which has a collar extending beyond the side walls of the sprocket wheel B, and provided with a shoulder E on the periphery thereof.

Loosely mounted on the shaft A and within the sprocket is a counter-balance F, whose hub extends beyond the side walls of the sprocket, said balance having a shaft G at the lower end thereof. Mounted on said shaft are the different sized gear wheels H and J, the larger gear H of which meshes with the internal gear of the sprocket wheel B. A chain K passes around the gear D and the smaller gear J, whereby motion is imparted to the gear J, hence to the gear H, and thereby to the sprocket wheel B. Pivoted to said sprocket wheel B is a spring-actuated dog L, which is provided with a conical pin M, said dog being adapted to engage the shoulder E of the collar of the gear wheel D. Secured to the axle A is a collar N, which has the flanges Q, and a movable sleeve R which is adapted to bear against the pin M, and is provided with a spring which returns it to its original position after it has been moved therefrom.

S designates a bar secured at a suitable point to the bicycle, and having the eye bars T, U, pivoted at either end. The bar T is provided with the wedges V, and surrounds the collar N, while the bar U has the spur W, and embraces the collar P of the counter-balance F which has an opening which is adapted to receive the spur W.

The operation of the device is as follows: When it is desired to ascend a hill, the bar S is moved, so that as the bar U is drawn in, the spur W enters the opening in the collar, and as the bar T is forced out, the wedges bear against the sleeve R, which forces up the pin M and thus releases the dog L from the shoulder E. The counter-balance F is held still because of the spur W, in collar P thereof. Hence the gear D gives motion to the chain K, thence to the gear J, and thereby to the large gear H, which meshing with the sprocket wheel B imparts motion at the periphery thereof, and an increase of power is thereby obtained. When the bicycle is on a level, and speed is desired, the bar S is reversed. Thereby the counter-balance F is released and the dog L engages the shoulder E, and motion is imparted at the center of the wheel and speed thus obtained.

Fig. 5 shows a modified form of imparting motion to the periphery of the wheel by means of a gear and chain, whereby one gear is dispensed with.

Having thus described my invention, what I claim as new, and desire to secure by Letters Patent, is—

1. An axle, a hollow sprocket wheel thereon, a counter-balance on said axle having a notched collar, a bar with a spur adapted to engage and lock said collar a wheel on said axle and within said sprocket wheel having a projecting collar with a shoulder thereon, wheels of different diameters having a shaft on said counter-balance, and gearing with said inner and sprocket wheels substantially as described, a movable collar adapted to engage and operate a dog on said sprocket wheel, mechanism substantially as described for operating said movable collar, said parts being combined substantially as described.

2. An axle, a hollow sprocket wheel mounted on said axle and provided with internal gearing, a counter-balance on said axle, a wheel within said sprocket wheel on said axle, a dog on said sprocket wheel engaging said inner wheel, differential wheels carried by said counter-balance and gearing with said inner and sprocket wheels substantially as described, a pivoted operating bar having two bars connected therewith, one for locking said counter balance, and means connected with the other of the two bars for disengaging said dog, said parts being combined substantially as described.

3. A hollow wheel with a dog pivoted thereon, an inner wheel on the axle of the said hollow wheel having a projecting collar with a shoulder engaged by said dog, a collar on the axle having flanges, a movable collar on said first mentioned collar bearing against a pin on the said dog, and a bar with wedges engaging said movable collar, said parts being combined substantially as described.

4. An axle having mounted thereon a hollow wheel provided with internal gear, a counter-balance on said axle, the wheel D on said axle having a projecting collar with a shoulder thereon, a dog on said hollow wheel engaging said shoulder, a counter-balance on said axle carrying the wheels H and J of different diameters and gearing with the hollow wheel and the said wheel D as described, an operating bar with bars pivoted thereto, one of said pivoted bars engaging a collar on the counter-balance for locking the same, means mounted on the axle and operated by the movement of the other of said pivoted bars for disengaging said dog from said shoulder, said parts being combined substantially as described.

WILLIAM A. WRIGHT.

Witnesses:
JOHN A. WIEDERSHEIM,
A. P. JENNINGS.